United States Patent [19]

Ikeda

[11] Patent Number: 5,475,744
[45] Date of Patent: Dec. 12, 1995

[54] PRIVATE BRANCH EXCHANGE CAPABLE OF ADDING A CALLING STATION ID NUMBER TO THE CALL SIGNAL

[75] Inventor: Nobuhiro Ikeda, Kawasaki, Japan

[73] Assignee: Canon Kabushiki Kaisha, Tokyo, Japan

[21] Appl. No.: 324,491

[22] Filed: Oct. 18, 1994

Related U.S. Application Data

[63] Continuation of Ser. No. 791,241, Nov. 13, 1991, abandoned.

[30] Foreign Application Priority Data

Nov. 15, 1990 [JP] Japan ................................ 2-309039

[51] Int. Cl.$^6$ ..................... H04M 15/00; H04M 1/56; H04M 3/42; H04M 7/00
[52] U.S. Cl. ..................... 375/127; 375/142; 375/201; 375/239; 375/245
[58] Field of Search ..................... 379/127, 142, 379/157, 201, 239, 235, 295, 249, 204; 370/62.1, 110.1, 58

[56] References Cited

U.S. PATENT DOCUMENTS

| | | | |
|---|---|---|---|
| 3,725,596 | 4/1973 | Maxon et al. | 379/127 |
| 3,967,073 | 6/1976 | Anderson et al. | 379/127 |
| 4,942,598 | 7/1990 | Davis | 379/142 X |
| 4,961,217 | 10/1990 | Akiyama | 379/142 X |
| 4,994,797 | 2/1991 | Breeden | 379/142 X |
| 5,008,884 | 4/1991 | Yazawa et al. | 370/110.1 |

*Primary Examiner*—Stephen Chin
*Assistant Examiner*—Paul Loomis
*Attorney, Agent, or Firm*—Fitzpatrick, Cella, Harper & Scinto

[57] ABSTRACT

A private branch exchange includes a detector that detects a transmission request to an external line by an extension terminal. An identifying circuit identifies the direct inward dialing number of the transmitting extension terminal and a transmitter transmits the direct inward dialing number of the transmitting extension terminal that is identified by the identifying circuit to the external line.

18 Claims, 7 Drawing Sheets

| EXTENSION NUMBER (E1) | DIAL-IN NUMBER (E2) | RECEPTION GROUP NUMBER (E3) |
|---|---|---|
| 2000 | 03-787-8361 | 1 |
| 2001 | 03-787-8672 | 1 |
| 2002 | 03-787-8383 | 1 |
| 2100 | NONE | 2 |
| 2101 | NONE | 2 |
| ⋮ | ⋮ | ⋮ |
| 4999 | NONE | 20 |

FIG. 2A

| EXTENSION NUMBER (E1) | DIAL-IN NUMBER (E2) | RECEPTION GROUP NUMBER (E3) |
|---|---|---|
| 2000 | 03-787-8361 | 1 |
| 2001 | 03-787-8672 | 1 |
| 2002 | 03-787-8383 | 1 |
| 2100 | NONE | 2 |
| 2101 | NONE | 2 |
| ⋮ | ⋮ | ⋮ |
| 4999 | NONE | 20 |

FIG. 2B

| RECEPTION GROUP NUMBER (E4) | DIAL-IN NUMBER (E5) |
|---|---|
| 1 | NONE |
| 2 | 03-788-8261 |
| 3 | 03-788-8272 |
| 4 | 03-788-8283 |
| 5 | NONE |
| 20 | NONE |

FIG. 6

| EXTENSION NUMBER E61 | EXTENSION TERMINAL IDENTIFICATION E62 | DIAL-IN NUMBER E63 | RECEPTION GROUP NUMBER E64 |
|---|---|---|---|
| 2000 | INHERENT | 03-787-8361 | 1 |
| 2001 | INHERENT | 03-787-8672 | 1 |
| 2100 | NONE | NONE | 2 |
| --- | --- | --- | --- |
| 3001 | MULTIPLE | 03-788-8693 | 3 |
| --- | --- | --- | --- |
| 4001 | MULTIPLE | 03-788-8704 | NONE |
| 4002 | MULTIPLE | 03-788-8705 | NONE |
| 4999 | NONE | NONE | 20 |

PRIVATE BRANCH EXCHANGE CAPABLE OF ADDING A CALLING STATION ID NUMBER TO THE CALL SIGNAL

This application is a continuation of application Ser. No. 07/791,241 filed Nov. 13, 1991, now abandoned.

BACKGROUND OF THE INVENTION

1. Field of the Invention

The invention relates to a private branch exchange which can be connected to a network for providing a transmission partner's number notification service.

2. Related Background Art

At present, in the INS (Information Network System) as an ISDN of Japan, a transmission partner's number notification service to notify the transmission user's number (including the sub address) to the reception user is executed. In the above service between the terminals, the transmission user can select whether the transmission partner's number is notified every call or not. Generally, when the transmission partner's number can be notified, the transmission user's number (transmission partner's number) is sent every call upon transmission. When the transmission partner's number is not notified by the transmission user, the INS adds the transmission partner's number of the default at the time of the contraction and sends to the reception terminal in accordance with the content of the contract (for instance, when the notifying mode is an always permitting mode).

The transmission partner or the like can be discriminated on the reception side by the above service. Various kinds of services such as a check and the like of a membership system of a data base, a telemarketing, or the like have been realized.

In the private network such as a PBX or the like, hitherto, in the case where a call is generated from an extension terminal by using the INS, the INS adds a pilot number (representative number) and sends to the reception terminal so long as the private network has already made a representative contract. As described in "An Exchange Terminology" (An Electronics and Communication Terminology No. 15) published in Japan by the Institute of Electronics and Communication Engineers of Japan (IECE) on Mar. 31, 1983, "pilot number service" refers to a service in which call reception to plural telephone sets is performed by using a single telephone number. The plural telephone sets are grouped, and one of these telephone sets is selected as the representative telephone set. When a call to a representative subscriber is received, the call is connected to the free (i.e., not busy) telephone set in the group according to a predetermined priority order. When the representative contract is not made yet, the INS adds the number of the default upon contract of the line which is connected as a transmission partner number and sends to the reception terminal.

SUMMARY OF THE INVENTION

It is an object of the invention to effectively use the transmission partner's number notification service.

Another object of the invention is that which one of the extensions of a telephone exchange has transmitted is notified to the reception side.

Still another object of the invention is that the direct inward-dialing number of the extension which has transmitted is notified to the reception side.

Further another object of the invention is that an extension belonging to which one of reception groups of a telephone exchange has transmitted is notified to the reception side.

Further another object of the invention is that the direct inward dialing number of a reception group belonging to an extension which has transmitted is notified to the reception side.

The above and other objects and features of the present invention will become apparent from the following detailed description and the appended claims with reference to the accompanying drawings.

BRIEF DESCRIPTION OF THE DRAWINGS

FIGS. 2A and 2B are data table diagrams corresponding to extension numbers stored in a memory unit in the first embodiment;

FIG. 6 is a data table diagram in the second embodiment of the invention; and

DETAILED DESCRIPTION OF THE PREFERRED EMBODIMENTS

Figure 1:
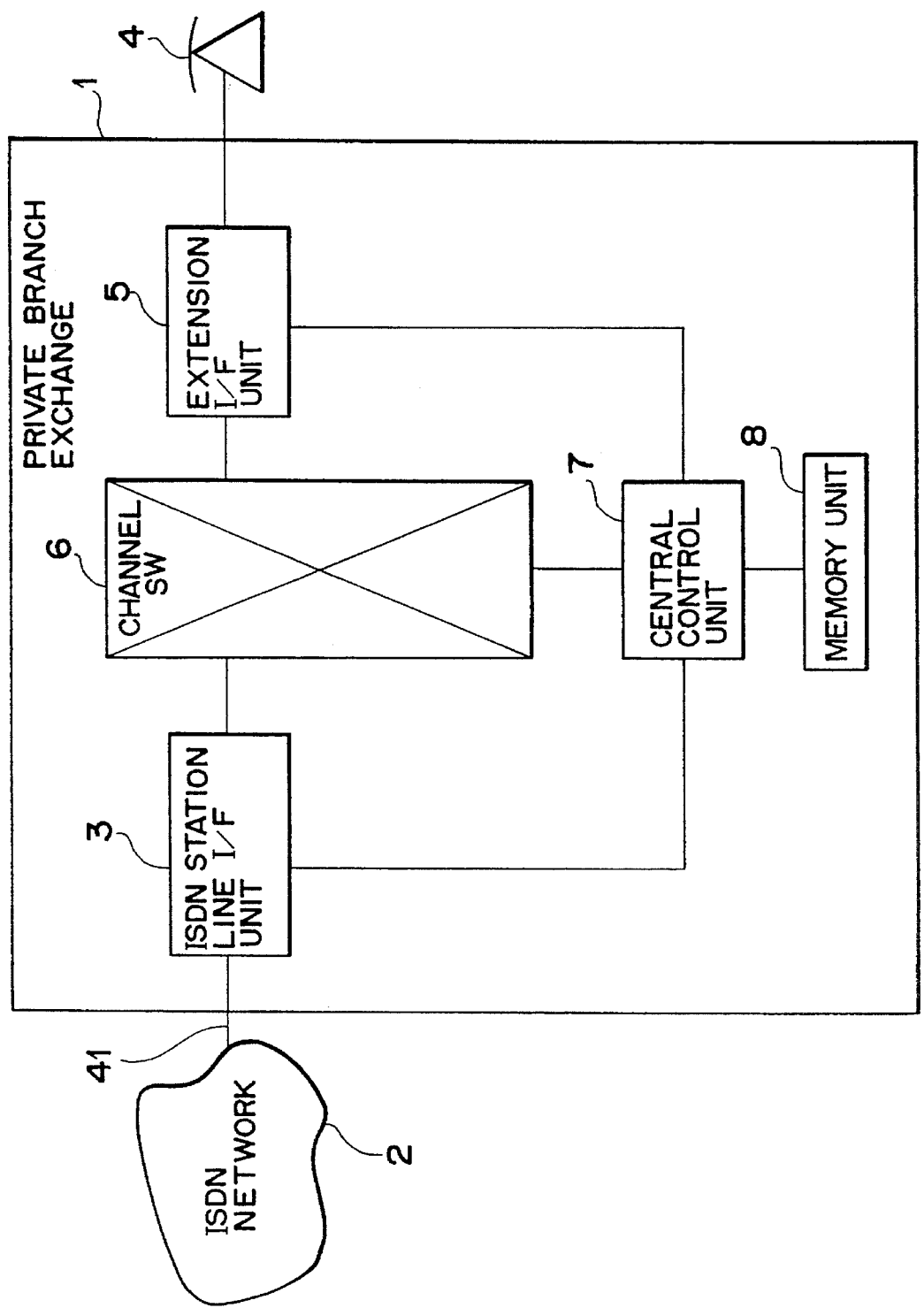
FIG. 1 is a constructional diagram of a private branch exchange which embodies the invention.

FIG. 1 is a constructional diagram of a private branch exchange embodying the invention. In the diagram, reference numeral 1 denotes a private branch exchange embodying the invention; 2 an ISDN network; 3 an ISDN station line interface unit which encloses station lines of the ISDN network 2; 4 an extension terminal; 5 an extension interface unit which encloses the extension terminal 4; 6 a channel switch; 7 a central control unit; 8 a memory unit; and 41 an ISDN station line.

Although not shown in FIG. 1, the private branch exchange 1 also connects an analog public network.

FIG. 2A is a table showing an example of set data of a direct inward-dialing number $E_2$ and a reception group number $E_3$ corresponding to an extension number $E_1$ of each extension terminal. FIG. 2B is a table showing an example of set data of a direct inward dialing number $E_5$ corresponding to a number $E_4$ of each reception group.

When the direct inward dialing number is received from the ISDN network, the central control unit 7 identifies the extension to be rung with reference to the tables shown in FIGS. 2A and 2B.

Figure 4:
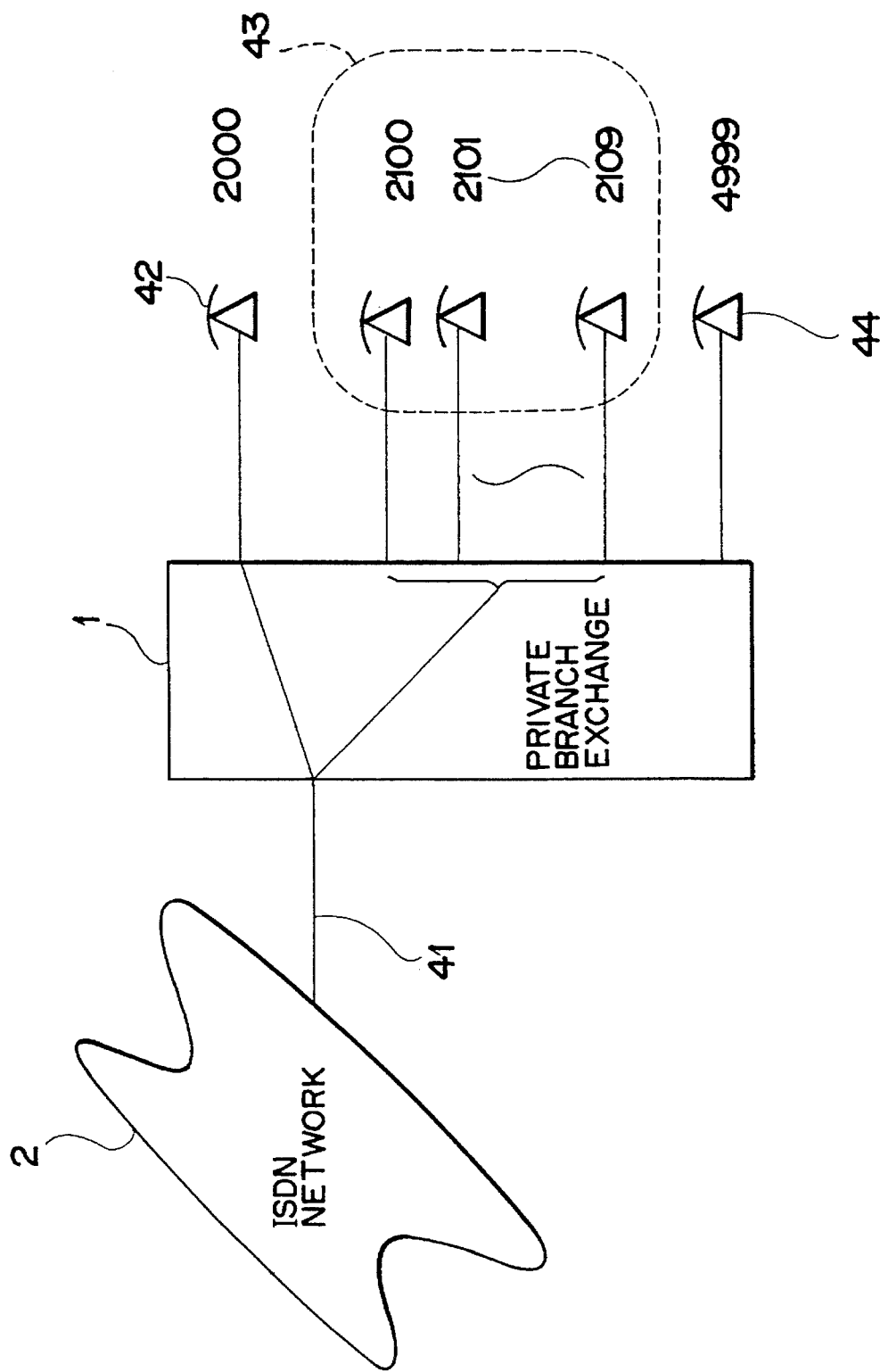
FIG. 4 is an extension terminal connection diagram for explaining the operation of the first embodiment of the invention.

FIG. 4 is a diagram showing a connection between the private branch exchange and extension terminals for explaining the first embodiment of the invention. Reference numerals 42 and 44 denote analog extension terminals and 43 indicates a set of analog extension terminals and a reception group which receives by the same direct inward dialing number.

In the above construction, the first embodiment of the invention will now be described with reference to the flowchart of FIG. 3 together with FIGS. 1, 2, and 4. When an analog extension terminal (extension number 2000) 42 in FIG. 4 is off-hooked and a dial transmission is performed, the extension interface unit 5 detects the off-hook (step S1) and notifies the detection of the off-hook to the central control unit 7. Subsequently, the dial number received from the analog extension terminal 42 is transmitted to the central control unit 7. The central control unit 7 analyzes the dial signal (step S2) and checks to see whether or not the transmission is an external line transmission (step S3). When it is an external line transmission (for instance, "0" transmission), the central control unit 7 checks a use state of the ISDN station line 41 by referring to the memory unit 8 (step S4). When the ISDN station line 41 can be used, the central control unit 7 captures the ISDN station line 41 and the processing routine advances to step S5.

When the transmission is not the external line transmission in step S3, the ordinary extension transmitting process is executed (step S3a). When the ISDN station line 41 cannot be used, the ordinary analog external line transmitting process is performed (step S4a).

When the ISDN station line 41 is captured, the central control unit 7 checks to see if the direct inward dialing number has been registered in the memory unit 8 in correspondence to the extension number 2000 of the transmission extension 42 or not. When the direct inward dialing (DI) number has been set into 2000 of the extension number $E_1$ of the data table (step S5), the central control unit 7 sets a SETUP message by using "03-787-8361" which is a direct inward dialing number $E_2$ as a transmission partner number information element. The central control unit 7 sends the SETUP message to the ISDN station interface unit 3. The interface unit 3 transmits the SETUP message to the ISDN network 2 (step S7).

Figure 3:
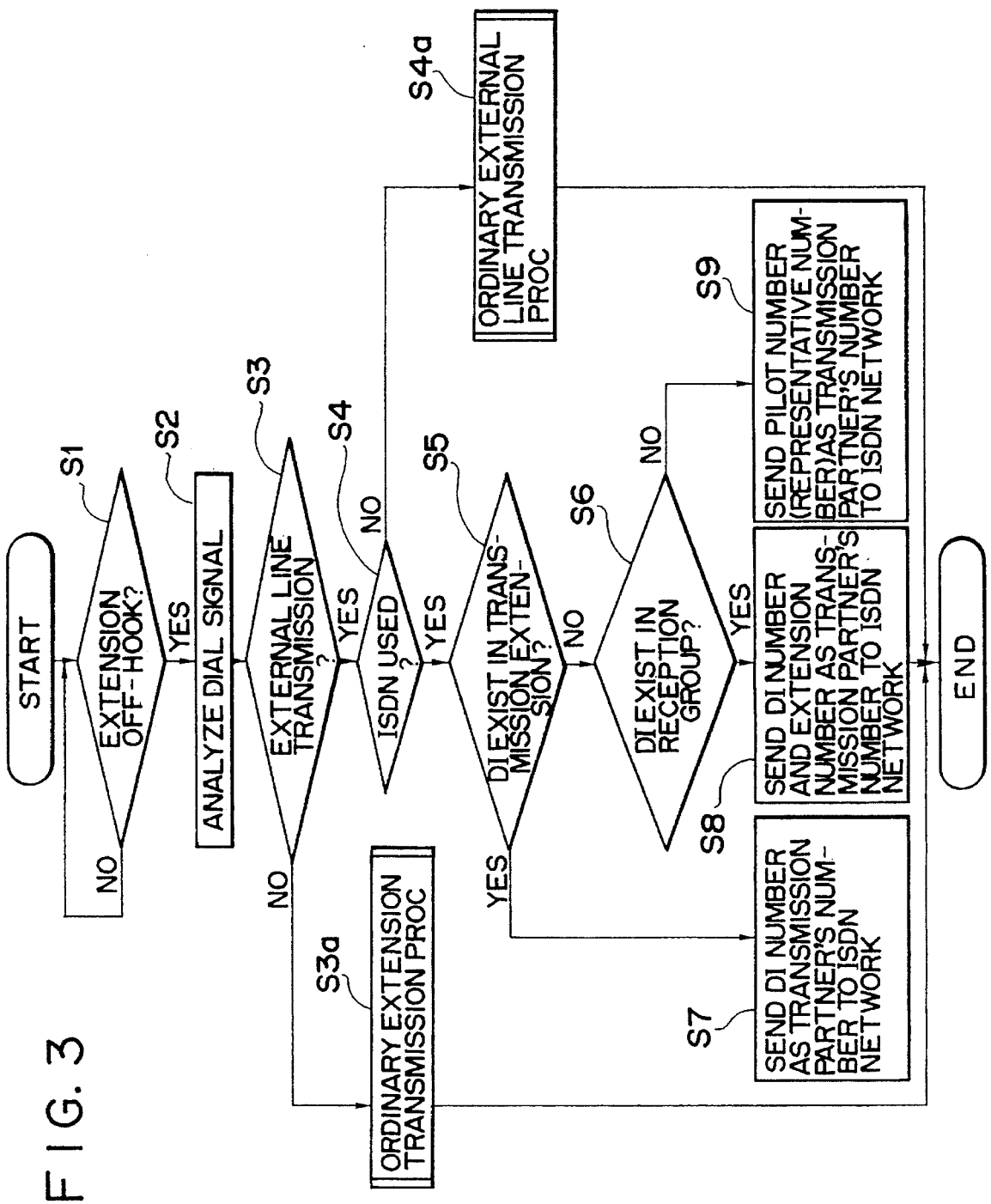
FIG. 3 is a flowchart showing a flow of the operation of the first embodiment of the invention.

When the extension terminal (extension number 2100) in the reception group 43 in FIG. 4 is off-hooked and the dial transmission is executed, the extension interface unit 5 and the central control unit 7 execute the processes in steps S1 to S5 in FIG. 3. When the direct inward dialing number corresponding to the extension number $E_1$ (2100) doesn't exist (step S5), the central control unit 7 identifies the reception group number "2" by referring to the reception group number $E_3$. Subsequently, the central control unit 7 refers to the data table shown in FIG. 2B in the memory unit 8 (step S6) and sets the SETUP message by using "03-788-8261" which is a direct inward dialing number $E_5$ of the relevant reception group number $E_4$ "2" as a transmission partner number information element and also sets the SETUP message by using the extension number 2100 as a generating sub address information element. The SETUP message is transmitted to the ISDN network 2 through the ISDN station line interface unit 3 (steps S6, S8).

When the dial-in number is not set for the reception group in step S6, the SETUP message is set by using the pilot number (representative number) as a transmission partner number information element and by using the extension number as a generating sub address information element and a call set message is transmitted to the ISDN network (step S9).

The second embodiment of the invention will now be described with reference to FIGS. 5, 6, and 7 together with FIG. 1 mentioned above.

Figure 5:
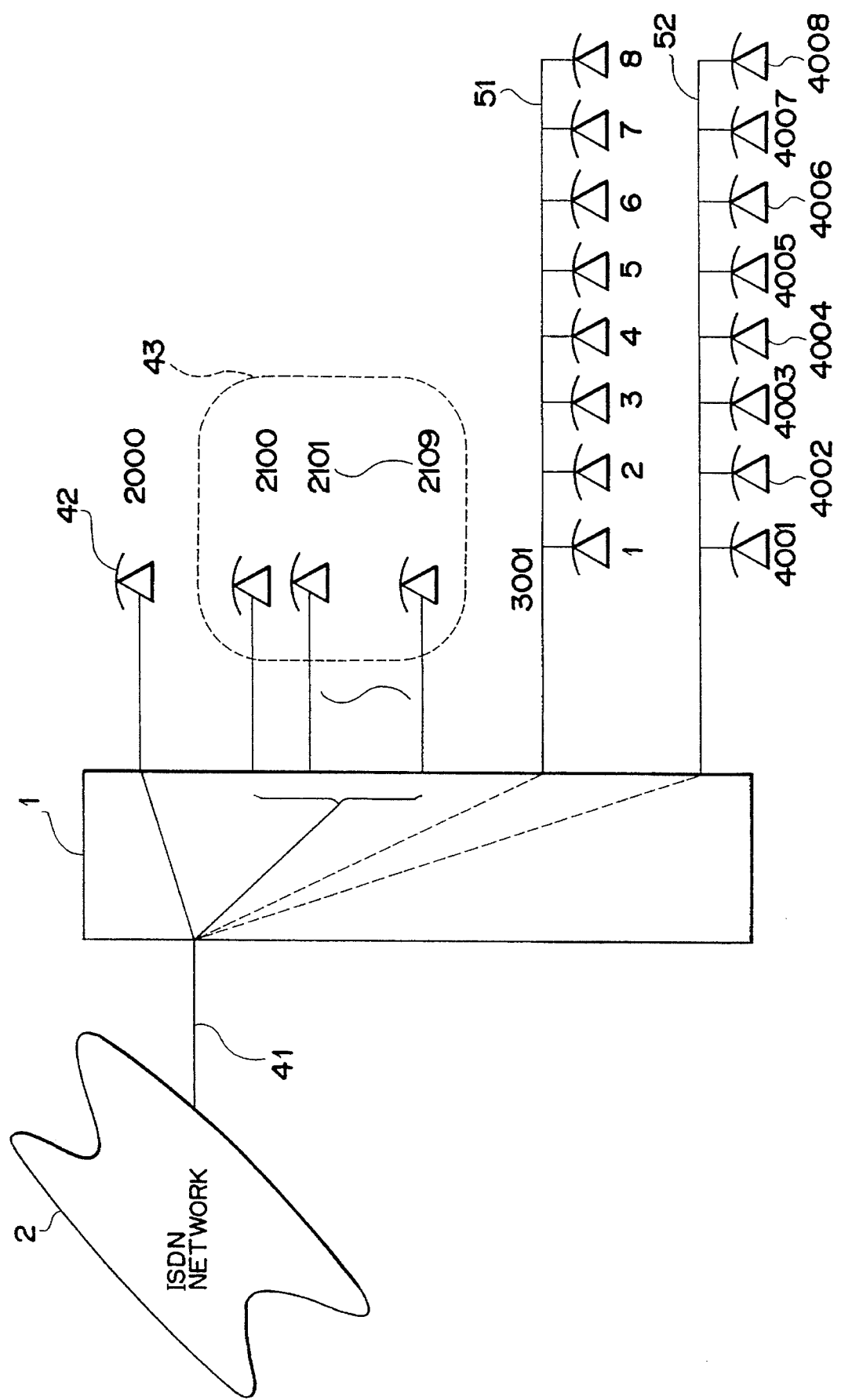
FIG. 5 is an extension terminal connection diagram for explaining the operation of the second embodiment of the invention.

FIG. 5 is a diagram showing a connection of extensions for explaining the second embodiment. In the diagram, reference numerals 51 and 52 denote ISDN extension terminals connected to the extension interface unit 5 through buses. In the ISDN extension terminal 51, one extension number 3001 is allocated to a plurality of ISDN terminals. In the ISDN extension terminal 52, extension numbers 4001 to 4008 are allocated to a plurality of ISDN terminals. FIG. 6 is a table showing an example of set data of an extension terminal identification $E_{62}$, a direct inward dialing number $E_{63}$, and a reception group number $E_{64}$ corresponding to each extension number $E_{61}$.

Figure 7:
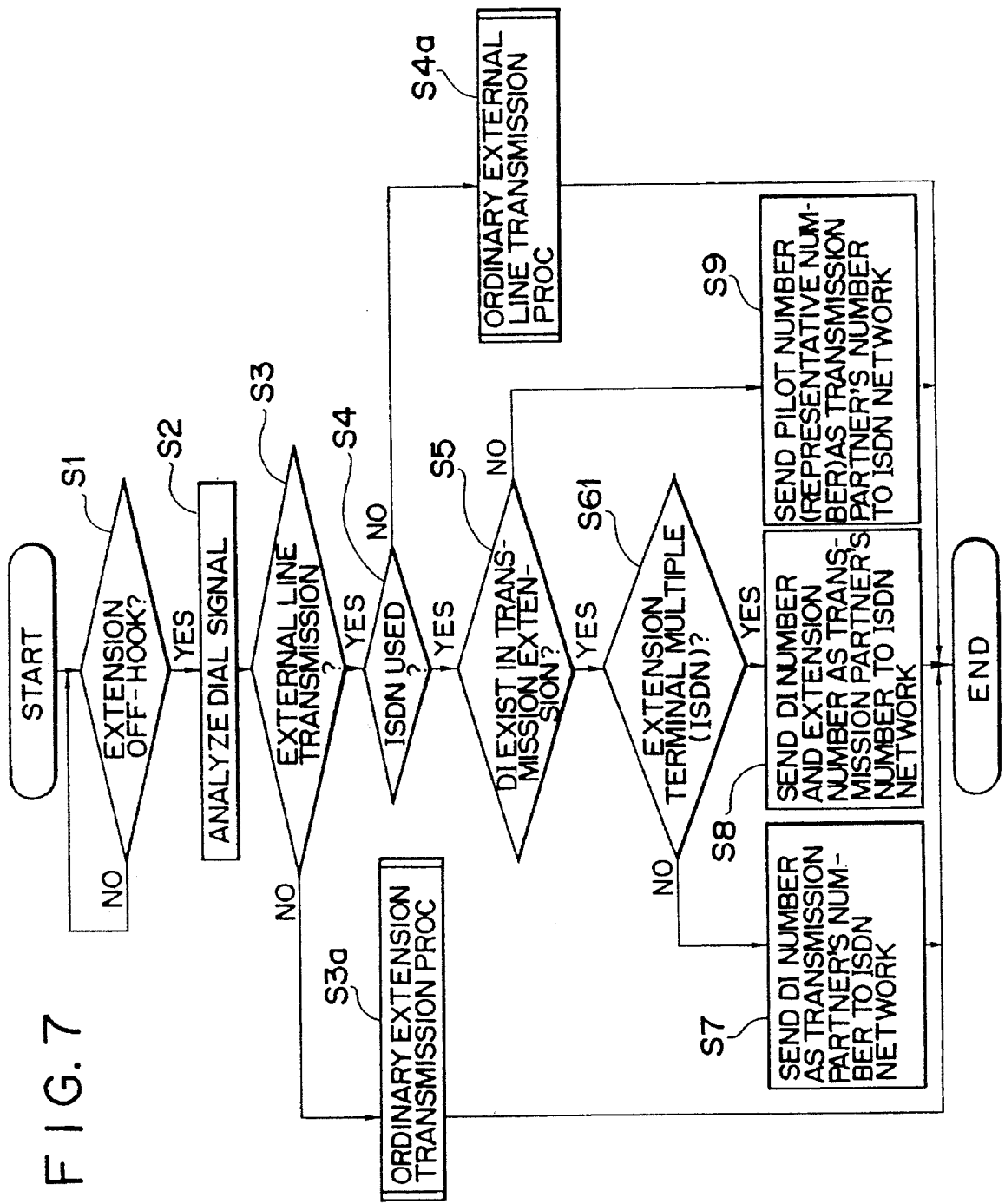
FIG. 7 is a flowchart showing the flow of the operation of the second embodiment of the invention.

When the extension is off-hooked and the dial transmission is performed, the extension interface unit 5 and the central control unit 7 executes processes in steps S1 to S5 in FIG. 7 in a manner similar to steps S1 to S5 in FIG. 3. In the case where the direct inward dialing number $E_{63}$ is set in the transmission extension, the central control unit 7 checks to see if the extension terminal is multiple-connected onto the same interface or is inherently connected with reference to the extension terminal identification $E_{62}$ (step S61). In the case of the inherent connection, the central control unit 7 sets the SETUP message by using the direct inward dialing number $E_{63}$ (03-787-8361, for instance, in the case where the extension of the extension number "2000" has performed the external line transmission) as a transmission partner number information element in step S7. On the other hand, in the case of the multiple connection, the central control unit 7 sets the SETUP message by using the relevant direct inward dialing number $E_{63}$ (03-788-8704, for example, in the case where the extension of the extension number "4001" has performed the external line transmission) as a transmission partner number information element and also by using the extension number (4001) as a generating sub address information element (step S8). The SETUP message is transmitted to the ISDN network (step S8).

Although the invention has been described above with respect to the preferred embodiments, the invention is not limited to the foregoing embodiments but many modifications and variations are possible within the spirit and scope of the appended claims of the invention.

What is claimed is:

1. A private branch exchange comprising:
   memory means for storing respective direct inward dialing numbers of a plurality of extension terminals;
   detecting means for detecting a calling request to an external network from one of the plurality of extension terminals;
   identifying means for identifying the direct inward dialing number of one of the plurality of extension terminals based on the direct inward dialing numbers stored in said memory means, the direct inward dialing number of one of the extension terminals being a number for directly connecting an incoming call to the exchange with one of the plurality of extension terminals when a terminal connected to the external network makes an outgoing call to the external network using the direct inward dialing number; and
   transmitting means for transmitting the direct inward dialing number of one of the plurality of extension terminals identified by said identifying means to the external network.

2. A private branch exchange to transmit a SETUP message to an ISDN, comprising:
   memory means for storing respective direct inward dialing numbers of a plurality of extension terminals:
   detecting means for detecting a calling request to the ISDN from one of the plurality of extension terminals;
   identifying means for identifying the direct inward dialing number of the one of the plurality of extension terminals based on the direct inward dialing numbers stored in said memory means, the direct inward dialing number of one of the plurality of extension terminals being a number for directly connecting an incoming call to the exchange with one of the plurality of extension terminals when a terminal connected to the ISDN makes an outgoing call to the ISDN using the direct inward dialing number; and setting means for setting the SETUP message by using the direct inward dialing number of one of the plurality of extension terminals identified by said identifying means as a calling party information element.

3. A private branch exchange for exchanging a plurality of extension terminals, comprising:

memory means for storing a plurality of direct inward dialing numbers corresponding to the plurality of extension terminals, the direct inward dialing numbers being numbers for directly connecting an incoming call to the exchange with a corresponding one of the plurality of extension terminals when a terminal connected to an external network makes an outgoing call to the external network using one of the direct inward dialing numbers;

detecting means for detecting a connection request to an external line sent by one of the plurality of extension terminals;

selecting means for selecting one of the plurality of direct inward dialing numbers corresponding to one of the plurality of the extension terminals; and transmitting means for transmitting the one of the direct inward dialing numbers selected by said selecting means to the external network.

4. A private branch exchange for exchanging a plurality of extension terminals and transmitting an SETUP message to an ISDN, comprising:

memory means for storing a plurality of direct inward dialing numbers corresponding to the plurality of extension terminals, the direct inward dialing numbers being numbers for directly connecting an incoming call to the exchange with a corresponding one of the plurality of extension terminals when a terminal connected to the ISDN makes an outgoing call to the ISDN using one of the direct inward dialing numbers;

detecting means for detecting a calling request to the ISDN sent by one of the plurality of extension terminals;

selecting means for selecting one of the plurality of direct inward dialing numbers corresponding to the one of the plurality of extension terminals detected by said detecting means; and setting means for setting the SETUP message by using the direct inward dialing number selected by said selecting means as a calling party information element.

5. An exchange according to claim 1, wherein said identifying means identifies the direct inward dialing number of a called group to which the calling terminal belongs.

6. A private branch exchange according to claim 1, wherein the external line includes an ISDN.

7. A private branch exchange according to claim 3, wherein the external line includes an ISDN.

8. A private branch exchange for exchanging a plurality of extension terminals, comprising:

memory means for storing a direct inward dialing number;

determining means for determining whether the direct inward dialing number corresponding to a calling extension terminal is stored in said memory means; and transmitting means for transmitting a selected one of (1) the direct inward dialing number corresponding to a specific one of the plurality extension terminals and (2) a number corresponding to the plurality of extension terminals based on a determination by said determining means, to an external network, wherein the direct inward dialing number is a number for directly connecting an incoming call to the exchange with the specific one of the plurality of extension terminals when a terminal connected to the external network makes an outgoing call to the external network using the direct inward dialing number, and the number corresponding to the plurality of extension terminals is a number for connecting a non-specific one of the plurality of extension terminals when the terminal connected to the external network makes the outgoing call to the external network using the number corresponding to the plurality of extension terminals.

9. A private branch exchange according to claim 8, wherein the external line includes an ISDN.

10. A private branch exchange for exchanging a plurality of extension terminals and transmitting a SETUP message to an ISDN, comprising:

memory means for storing a direct inward dialing number;

determining means for determining whether the direct inward dialing number corresponding to a calling extension terminal is stored in said memory means; and setting means for setting the SETUP message by using a selected one of (1) the direct inward dialing number corresponding to a specific one of the plurality of extension terminals and (2) a number corresponding to the plurality of extension terminals, based on a determination by said determination means, wherein the direct inward dialing number is number for directly connecting an incoming call to the exchange with the specific one of the plurality of extension terminals when a terminal connected to the ISDN makes an outgoing call to the ISDN using the direct inward dialing number, and the number corresponding to the plurality of extension terminals is a number for connecting a non-specific one of the plurality of extension terminals when the terminal connected to the ISDN makes the outgoing call to the ISDN using the number corresponding to the plurality of extension terminals.

11. A private branch exchange according to claim 3, wherein the connection request includes a calling request.

12. A private branch exchange according to claim 3, wherein said transmitting means transmits an outgoing call signal including the direct inward dialing number.

13. A private branch exchange according to claim 1, wherein said transmitting means transmits an outgoing call signal including the direct inward dialing number.

14. A private branch exchange according to claim 8, wherein said transmitting means transmits an outgoing signal including the direct inward dialing number corresponding to the specific one of the plurality of extension terminals or the number corresponding to the plurality of extension terminals.

15. An outgoing call method in a private exchange having a memory to store respective direct inward dialing numbers of a plurality of extension terminals, comprising the steps of:

detecting an outgoing call to an external network from one of the plurality of extension terminals;

identifying the direct inward dialing number of one of the plurality of extension terminals based on the numbers stored in the memory, the direct inward dialing number of one of the extension terminals being a number for directly connecting an incoming call to the exchange with one of the plurality of extension terminals when the terminal connected to the external network makes an outgoing call to transmitting the direct inward dialing number of one of the plurality of extension terminals identified in said identifying step to the external network.

16. A method according to claim 15, wherein an outgoing call signal including the direct inward dialing number is transmitted in said transmitting step.

17. A method according to claim 15, wherein the direct inward dialing number is transmitted to an ISDN as the external network in said transmitting step.

18. A method according to claim 15, wherein a number corresponding to the plurality of extension terminals is transmitted in said transmitting step when the direct inward dialing number is not stored in the memory.

* * * * *

UNITED STATES PATENT AND TRADEMARK OFFICE
CERTIFICATE OF CORRECTION

PATENT NO. : 5,475,744
DATED : December 12, 1995
INVENTOR(S) : NOBUHIRO IKEDA

It is certified that error appears in the above-identified patent and that said Letters Patent is hereby corrected as shown below:

COLUMN 3

Line 9 "transmission" should read --transmission or not--.

COLUMN 4

Line 5 "table" should read --table diagram--.

COLUMN 4

Line 62 "terminals:" should read --terminals;--.

COLUMN 5

Line 35 "an" should read --a--.

COLUMN 7

Line 8 "call to" should read --call to the external network using the direct inward dialing number--.

Signed and Sealed this

Seventh Day of May, 1996

Attest:

BRUCE LEHMAN

Attesting Officer

Commissioner of Patents and Trademarks